(12) United States Patent
Lange

(10) Patent No.: US 9,628,564 B2
(45) Date of Patent: Apr. 18, 2017

(54) HIERARCHICAL INFORMATION MODIFICATION AND USE

(71) Applicant: Stephan Lange, St.Leon-Rot (DE)

(72) Inventor: Stephan Lange, St.Leon-Rot (DE)

(73) Assignee: SAP SE, Walldorf (DE)

( * ) Notice: Subject to any disclaimer, the term of this patent is extended or adjusted under 35 U.S.C. 154(b) by 199 days.

(21) Appl. No.: 14/231,512

(22) Filed: Mar. 31, 2014

(65) Prior Publication Data
US 2015/0281363 A1 Oct. 1, 2015

(51) Int. Cl.
*G06F 15/16* (2006.01)
*H04L 29/08* (2006.01)
*H04L 12/927* (2013.01)
*G06F 17/30* (2006.01)

(52) U.S. Cl.
CPC ........ *H04L 67/12* (2013.01); *G06F 17/30961* (2013.01); *H04L 47/808* (2013.01); *H04L 67/16* (2013.01)

(58) Field of Classification Search
CPC . G06F 17/30961; H04L 47/808; H04L 67/12; H04L 67/16
See application file for complete search history.

(56) References Cited

U.S. PATENT DOCUMENTS

| | | | |
|---|---|---|---|
| 5,638,438 A | 6/1997 | Keen | |
| 6,453,312 B1* | 9/2002 | Goiffon | G06F 17/30643 |
| 6,925,646 B1* | 8/2005 | Korenshtein | G06F 9/4433 |
| | | | 707/999.003 |
| 8,285,716 B1* | 10/2012 | Srinivasaiah | G06F 17/30241 |
| | | | 707/730 |
| 8,310,361 B1* | 11/2012 | Stout | G06F 17/30241 |
| | | | 340/539.11 |
| 2006/0230079 A1* | 10/2006 | Strahl | G06F 11/1435 |
| 2007/0208834 A1* | 9/2007 | Nanamura | G06F 9/46 |
| | | | 709/220 |
| 2007/0260971 A1* | 11/2007 | Rivas | G06F 17/2229 |
| 2011/0184962 A1* | 7/2011 | Palmer | G06Q 10/10 |
| | | | 707/754 |
| 2013/0054558 A1 | 2/2013 | Raza et al. | |
| 2013/0066853 A1 | 3/2013 | Andersson et al. | |

OTHER PUBLICATIONS

"European Application Serial No. 14004371.2, Search Report mailed Aug. 31, 2015", 7 pgs.

* cited by examiner

*Primary Examiner* — Vivek Srivastava
*Assistant Examiner* — Nicholas Celani
(74) *Attorney, Agent, or Firm* — Schwegman Lundberg & Woessner, P.A.

(57) ABSTRACT

Example systems and methods of using and modifying hierarchical information are presented. In one example, a request for information associated with a topic is received from a user device. In response to the request, first topic information corresponding to a first hierarchical level and second topic information corresponding to a second hierarchical level lower than the first hierarchical level are accessed. Combined topic information is generated which includes the first topic information that is modified based on the second topic information. The combined topic information is then transmitted to the user device for display on the user device.

20 Claims, 12 Drawing Sheets

HIERARCHICAL INFORMATION MODIFICATION AND USE

BACKGROUND

Due to continuing advancements in communication technology, the dissemination of information to those in need of that information on a global basis becomes faster and more dependable. However, given the many differences that exist between various areas of the world, such as national and local laws, cultural standards, language differences, and so on, not all information is equally applicable across the globe.

For example, an entity, such as a corporation or other organization, may provide information to its employees, members, customers, and other parties, with that information depending at least to some degree on a characteristic of the party, such as the current location of the party. The entity may provide this information to the party by way of web pages accessed via a computing system, an application employed on a smartphone, tablet, or similar device, or via other means. Presuming that the location of the party is a distinguishing factor as to what information that party receives from the entity, parties in different locations may receive some common information and some different information. More specifically, some portions of this information may be global in scope, some may be regional (and thus applicable, on a continental, national, and/or territorial scale), and some may be local in nature (restricted to a particular city, neighborhood, and/or address), for example.

Given the diverse nature of this information, different information providers within the entity may be responsible for each portion of the information. Presuming this information is provided by way of a single webpage or user interface, the overall effort expended to generate, revise, and coordinate the various portions of the information may increase as the amount of information increases.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that exemplify illustrative embodiments. In the following description, for purposes of explanation, numerous specific details are set forth to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1:
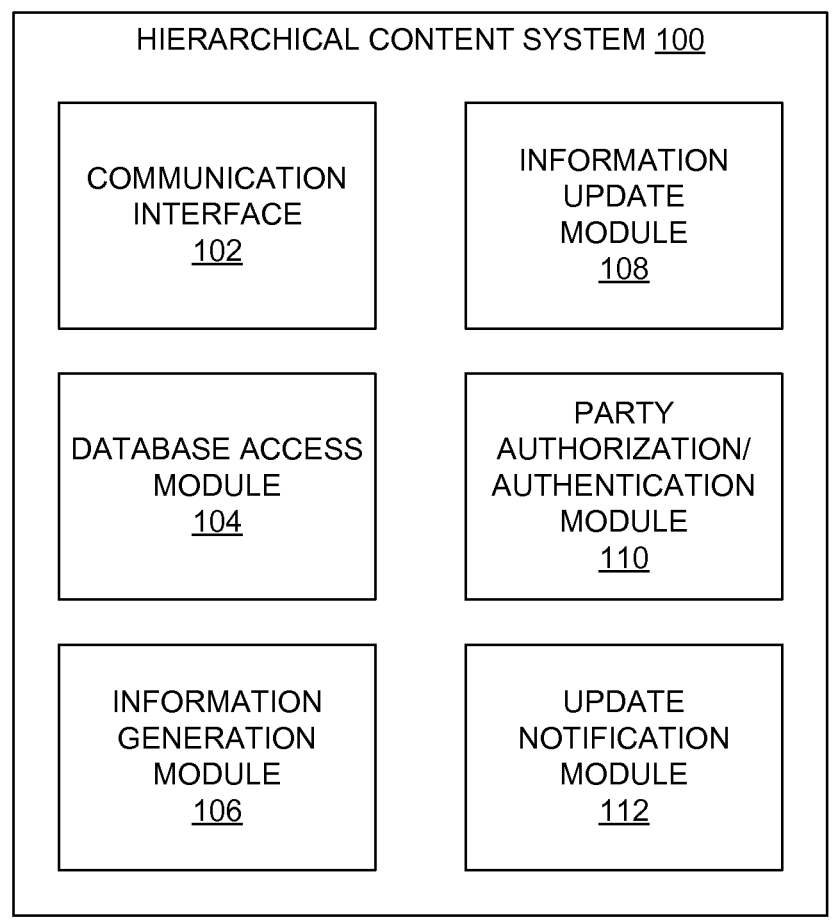
FIG. 1 is a block diagram of an example hierarchical content system configured to modify hierarchical content.

FIG. 1 is a block diagram of an example hierarchical content system 100 configured to facilitate modification and use of hierarchical data. As shown in the FIG. 1, the hierarchical content system 100 may include a communication interface 102, a database access module 104, an information generation module 106, an information update module 108, a party authorization/authentication module 110, and an update notification module 112. Other modules or components of the hierarchical content system 100 not shown in FIG. 1, such as, for example, a display, a user interface, one or more hardware processors, and the like, may be included in the hierarchical content system 100, but are not explicitly shown to focus and simplify the following discussion. Also, each of the modules 102-112 of FIG. 1 may be implemented in hardware, software, or some combination thereof. In some examples, any of the modules 102-112 may be combined with other modules, or may be separated into a greater number of modules.

Figure 3A:
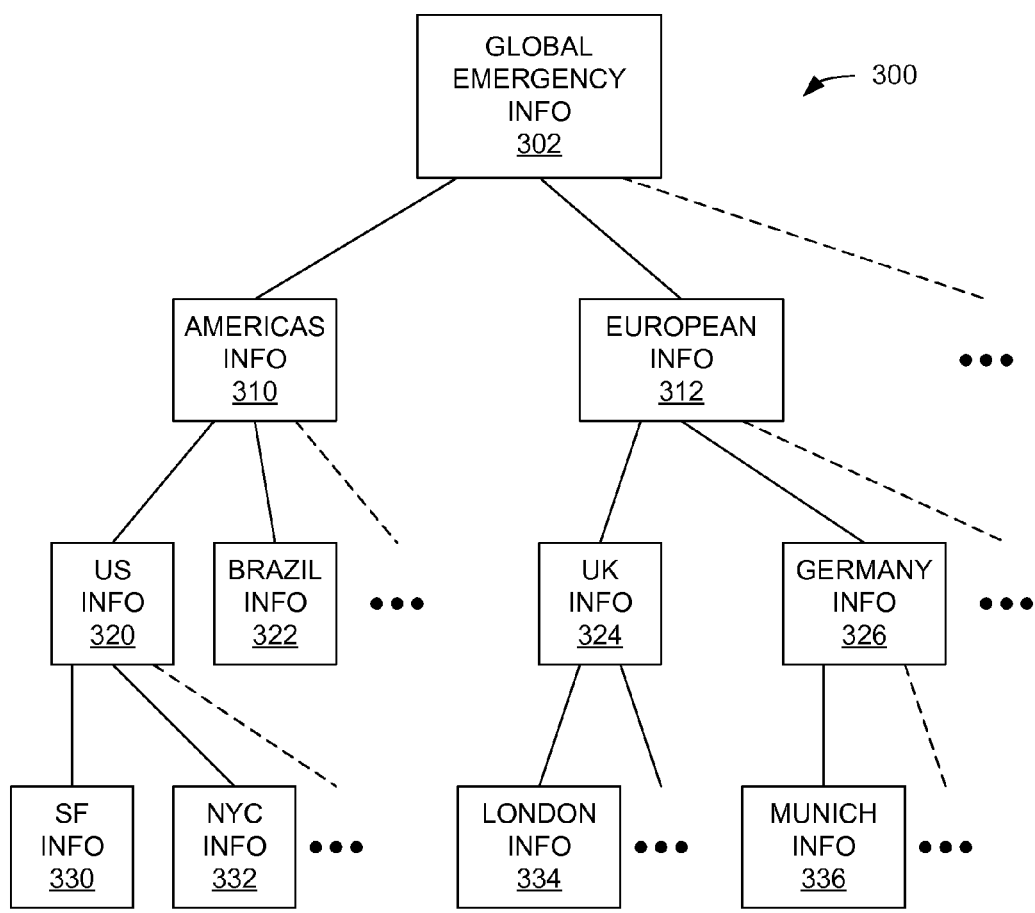
FIG. 3A is a block diagram of example hierarchical emergency information based on geographical areas.
Figure 3B:
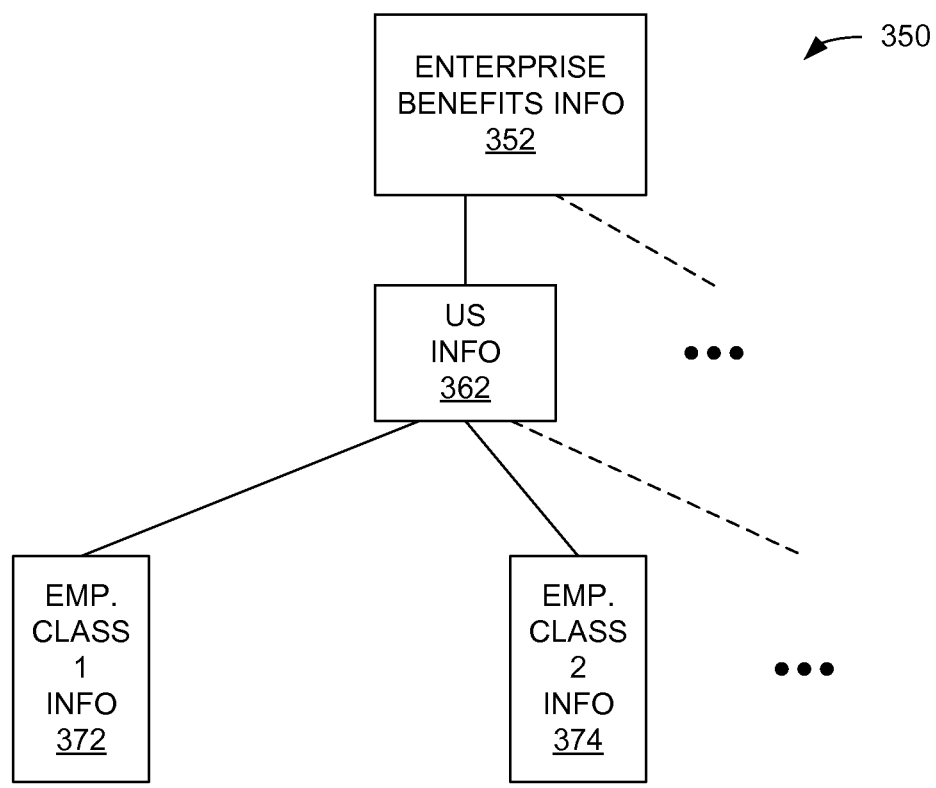
FIG. 3B is a block diagram of example hierarchical benefits information based on geographical areas and employee status.

Overall, the hierarchical content system 100 may be configured to access hierarchically-structured information and combine that information based at least in part on information related to the party to which the information is to be provided. In some examples, information at lower hierarchical levels may extend and/or override (or replace) information at higher hierarchical levels so that the information is tailored to one or more particular parties. Examples of two types of hierarchical information that may be employed in the hierarchical content system 100 are illustrated in FIGS. 3A and 3B.

In one example, the hierarchical content system 100 may be implemented on one or more servers, such as those discussed below in connection with FIG. 9. A user device may receive the information from such a server by way of a network, such as, for example, a wide-area network (WAN) (e.g., the Internet), a local-area network (LAN) (e.g., Ethernet or WiFi®), and/or a cellular (e.g., third generation (3G) or fourth generation (4G) network. The user device may explicitly request the data from the server, or such data may be "pushed" by the server to the user device in response to a previous user configuration, device configuration, user profile, or device profile serving as an implicit request.

In the hierarchical content system 100, the communication interface 102 may be configured to receive information requests from user devices, as well as to return the requested information to the user devices, such as by way of a WAN, LAN, cellular, or other wired or wireless network. The communication interface 102 may also facilitate access to one or more databases at which the hierarchical information may be stored.

The database access module 104 may be configured to facilitate access to a database storing the hierarchical information. Such access may include the initial storing of the hierarchical information, the updating of the hierarchical information, and the retrieving of the hierarchical information at different hierarchical levels for subsequent combining and transmission to a user device. The database being accessed may be a relational database in which the various hierarchical levels of information may be stored as one or more tables of data items. As a result, the database access module 104 may generate any relational read and/or write operations to access the information based on input received from other modules, such as, for example, the information generation module 106 and the information update module 108. In other examples, the database may be any data storage system in which the hierarchical information may be stored and accessed. The database access module 104 may access the database directly in some implementations, or may access the database by way of the communication interface 102 in other embodiments.

Figure 6:
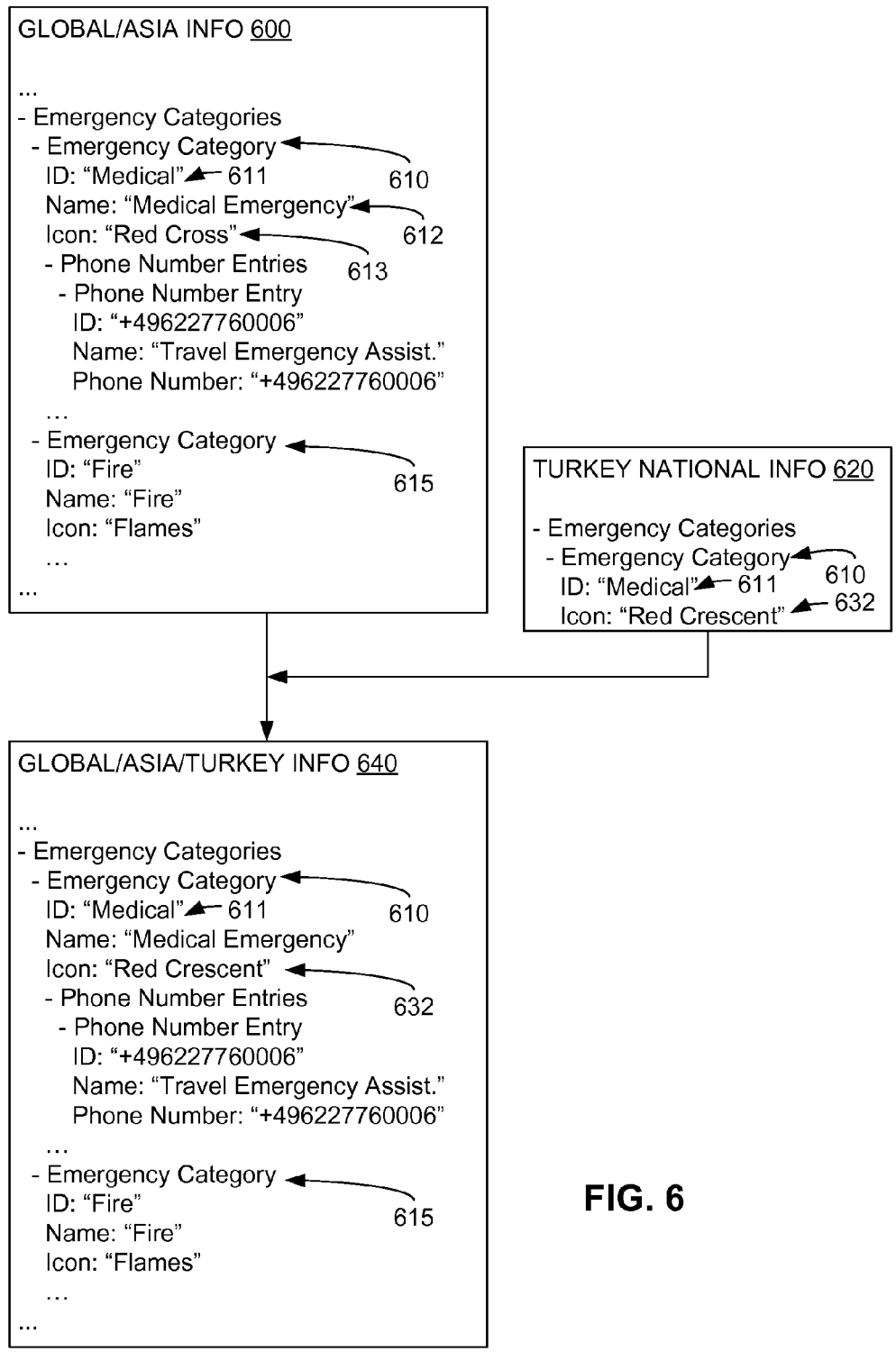
FIG. 6 is a flow diagram of example global and regional emergency information overwritten by national emergency information.
Figure 7:
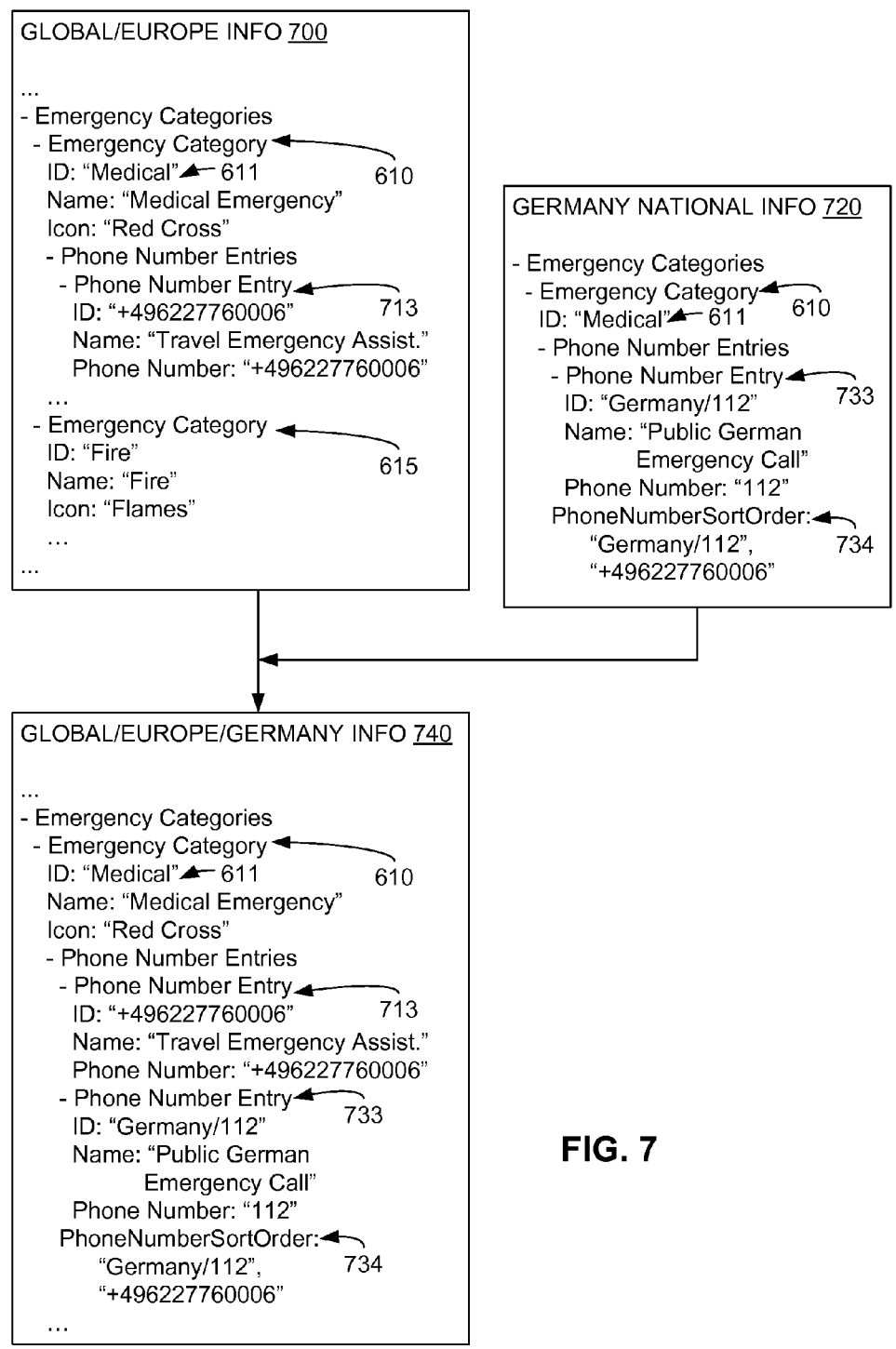
FIG. 7 is a flow diagram of example global and regional emergency information extended by national emergency information.

The information generation module 106 may be configured to access the hierarchical information from the database via the database access module 104 and combine two or more of the hierarchical levels of information before the resulting combined information is transmitted to a user device. This combining of levels may include, for example, the overriding or replacing of information from higher hierarchical levels using data from lower hierarchical levels, the extending or adding of information from higher hierarchical levels with information from lower hierarchical levels, and/or the removing or deleting of information supplied by higher hierarchical levels based on information from lower hierarchical levels. FIGS. 6 and 7 graphically depict examples of overriding and extending the hierarchical information in greater detail. In some examples, modification of inherited information from a higher hierarchical level may be allowed, while strict deletion of inherited information from a higher hierarchical level, without replacement by information corresponding to a lower hierarchical level, may be prohibited.

The information update module 108 may be configured to facilitate the updating or revising of hierarchical information at one or more hierarchical levels. Such updating may occur by way of queries provided by the requesting party to access the database. In another example, the information update module 108 may receive from the requesting party a file, such as a spreadsheet, that indicates the appropriate information to be generated or updated, and then may translate that information into the appropriate queries to access the information in the database. In one example, the information update module 108 may update hierarchical information at a particular hierarchical level in response to a request from a party authorized to update that information. To this end, the information update module 108, in response to receiving such a request, may employ the party authorization/authentication module 110, to authenticate the party.

More specifically, the party authorization/authentication module 110, in response to a request from a party via the information update module 108 to update the hierarchical information at a particular level, may determine whether that party possesses the authority to update or revise that information, and then indicate to the information update module 108 whether the party is authorized to perform the requested update. That authority may be granted by another party, or number of parties, that are responsible for delegating the authority. Further, the party authorization/authentication module 110 may be configured to authenticate the party by comparing one or more credentials (for example, a username and password) to stored credentials associated with the party to verify the identity of the party.

The update notification module 112 may be configured to inform one or more parties of an update of information at a hierarchical level in response to a notification or other signal from the information update module 108 that such an update has taken place. In some examples, the update notification module 112, in response to an update of information at a particular hierarchical level, may inform those parties responsible for updating information at lower hierarchical levels downstream from the updated higher-level hierarchical information. This notification may then cause the informed party to review the updated hierarchical information to determine whether changes are warranted for the lower hierarchical level or levels for which the informed party is responsible. Additional discussion regarding the updating function and the associated notification function are provided below.

Figure 2:
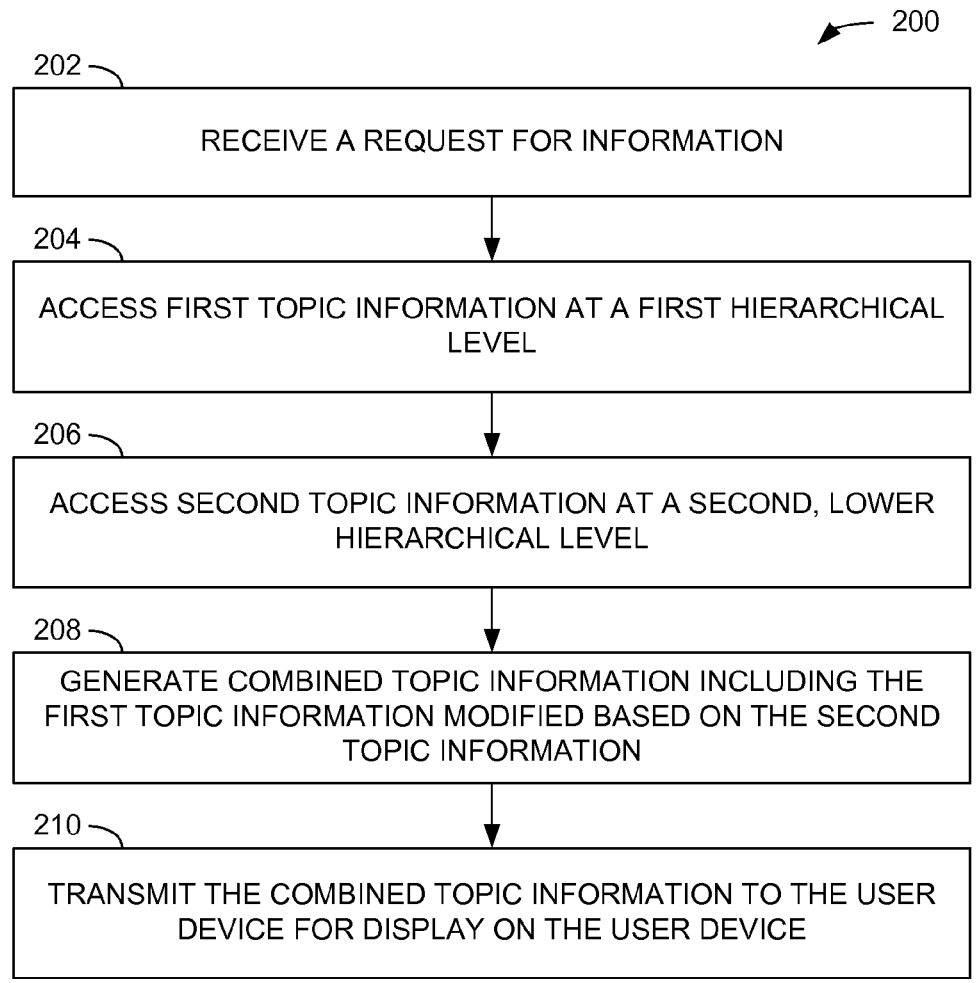
FIG. 2 is a flow diagram illustrating an example method to use hierarchical content.

FIG. 2 is a flow diagram illustrating an example method 200 of using hierarchical content. In one example, the hierarchical content system 100 and, more specifically, the information generation module 106, of FIG. 1 may perform the method 200, although other devices or systems not specifically described herein may perform the method 200 in other implementations.

In the method 200, a request for hierarchical information may be received (operation 202). In some implementations, the request may include an indication of the party or user device originating the request, and/or some information describing some aspect of the party or user device. For example, the request may include an indication of the current geographical location of the party or user device. In another embodiment, the request may include an indication of a particular job or role in which the party serves in a corporation or other organization. Other examples of one or more aspects or characteristics of the party (for example, demographics of the user, interests of the user, and so on) may be included with the request. In other implementations, at least some of the information regarding the user may be accessed in response to receiving the request, thus providing information regarding some aspect of the corresponding user.

In response to the request, first topic information at a first hierarchical level may be accessed (operation 204). In one example, the first topic information may include information associated with the highest hierarchical level of the hierarchical information. In other cases, the first topic information may include a combination of the hierarchical information from all hierarchical levels above a lowest hierarchical level associated with the party corresponding to the request.

Also in response to the request, second topic information at a second hierarchical level may be accessed (operation 206). The second topic information may be the lowest hierarchical level information associated with the party identified with the request. In another example, the second logic information may be a combination of information at all hierarchical levels below the hierarchical level or levels associated with the first topic information.

Combined topic information for the party may then be generated that includes the first topic information being modified based on the second topic information (operation 208). As mentioned above, the second topic information may extend, override, delete, or otherwise alter the first topic information to generate the combined topic information. In some implementations, as indicated above, two or more hierarchical levels of information may be reflected in either or both of the first topic information and the second topic information.

In examples in which more than three hierarchical information levels are available for the party associated with the request, the generation of the combined topic information may include accessing the highest of the hierarchical levels of information, which may then be combined with each lower level of hierarchical information, in succession, until the lowest hierarchical level applicable to the party is incorporated in the combined topic information.

Once the combined topic information is generated (operation 208), the combined topic information may be transmitted or otherwise forwarded to the requesting user device for display on the user device (operation 210). In other examples, the information may not be displayed, but may instead by employed by an application executing on the user device, such as, for example, configuration information.

While FIG. 2 depicts the operations 202-210 of the method 200 as being executed serially in a particular order, other orders of execution, including parallel or concurrent execution of one or more of the operations 202-210, are possible. For example the accessing of the first topic information and the second topic information (operations 204 and 206) may be performed concurrently or in parallel. Operations of other methods described herein may also be executed using alternative or parallel orders of execution.

FIGS. 3A and 3B provide two separate examples of hierarchical information that may be employed in the method 200 of FIG. 2. For instance, FIG. 3A is a block diagram of example hierarchical emergency information 300 based on multiple geographical areas associated with a corporate enterprise. The hierarchical emergency information 300 may include contact information in the event of a medical emergency, a fire, a criminal event, and so on that may be useful to a party. Other information, such as instructional information to address a medical emergency, may also be included in the hierarchical emergency information 300. As is described below in conjunction with FIGS. 4 and 5, such information may be provided to a user by way of a smartphone application executing on a device of the user, although such information may also be presented to the user on a desktop computer, laptop computer, tablet, or other communication device.

At the highest hierarchical level, global emergency information 302 may include emergency information that is applicable to all corporate locations, and possibly areas located outside the corporate locations as well. One hierarchical level below the global emergency information 302 are separate sets of regional emergency information, such as Americas emergency information 310, European emergency information 312, and so on.

Another hierarchical level below the regional emergency information is occupied by several separate sets of country emergency information, such as US emergency information 320, Brazil emergency information 322, UK emergency information 324, Germany emergency information 326, and the like. Further, each of the country information sets 320-326 is associated with its respective regional information set 310-312. More specifically, the US emergency information 320 and the Brazil emergency information 322 are associated with the Americas emergency information 310, and the UK emergency information 324 and the Germany emergency information 326 are related to the European emergency information 312.

Below the country information sets 320-326 lies another information hierarchy level: the local emergency information sets 330-336. For example, San Francisco emergency information 330 and New York City emergency information 332 correspond with the US emergency information 320, London emergency information 334 is associated with UK emergency information 324, and Munich emergency information 336 is related to Germany emergency information 326. Each of the local emergency information sets 330-336 may be associated with a particular corporate facility located in the locality, in one example.

As indicated in FIG. 3A, other sets of regional, country, and local information may also be provided, but are not explicitly depicted. Also, the specific implementation of FIG. 3A shows that not all of the lowest level information sets for a particular group of users or parties need be at the same hierarchical level. For example, while each of the US, UK and Germany users may have access to one of the local emergency information sets 330-336, users in Brazil may only have access to the country-level Brazil emergency information 322. Such may be the case if, for example, none of the localities in Brazil is associated with emergency information that is different and specific to that locality.

In one example, each set of emergency information 302-336 applies to the particular geographical area associated with that set. That particular set of emergency information may be based on laws, customs, service availability, and other factors associated with that particular area. By combining the various emergency information sets 302-336 that are applicable to a party or group, the emergency information provided to party or group at a particular location takes into account the various legal, customary, and other restrictions that are applicable to that particular location.

More specifically, by employing the embodiments of the method 200 of FIG. 2 to the hierarchical emergency information 300, emergency information for a particular party or individual may be generated by accessing the global emergency information 302 for the organization, and then incorporating the emergency information for each of the regional, country, and local information sets associated with that individual. For example, an individual currently located at the London site may receive emergency information that is a combination of the global emergency information 302, the European emergency information 312, the UK emergency information 324, and the London emergency information 334, in that order.

FIG. 3B is a block diagram of another example set of hierarchical information: hierarchical benefits information 350 based on geographical areas and employee status. In this example, the top hierarchical information is enterprise benefits information 352, which may include those types of benefits information that apply to the entire organization. In the next lower level, country-specific benefits information, such as US benefits information 362, is supplied. Below that hierarchical level, employee-class-specific benefits information 372, 374 may be supplied for one or more countries, including the US. In one example, classes of employee might include, for example, part-time employees and full-time employees, or hourly employees and salaried employees. Thus, a particular class-1 employee working in the US may thus receive benefits information, such as medical benefits, dental benefits, retirement benefits, and other benefits information, that represents a combination of the enterprise benefits information 352, the US benefits information 362, and the employee class-1 benefits information 372.

Figure 4:
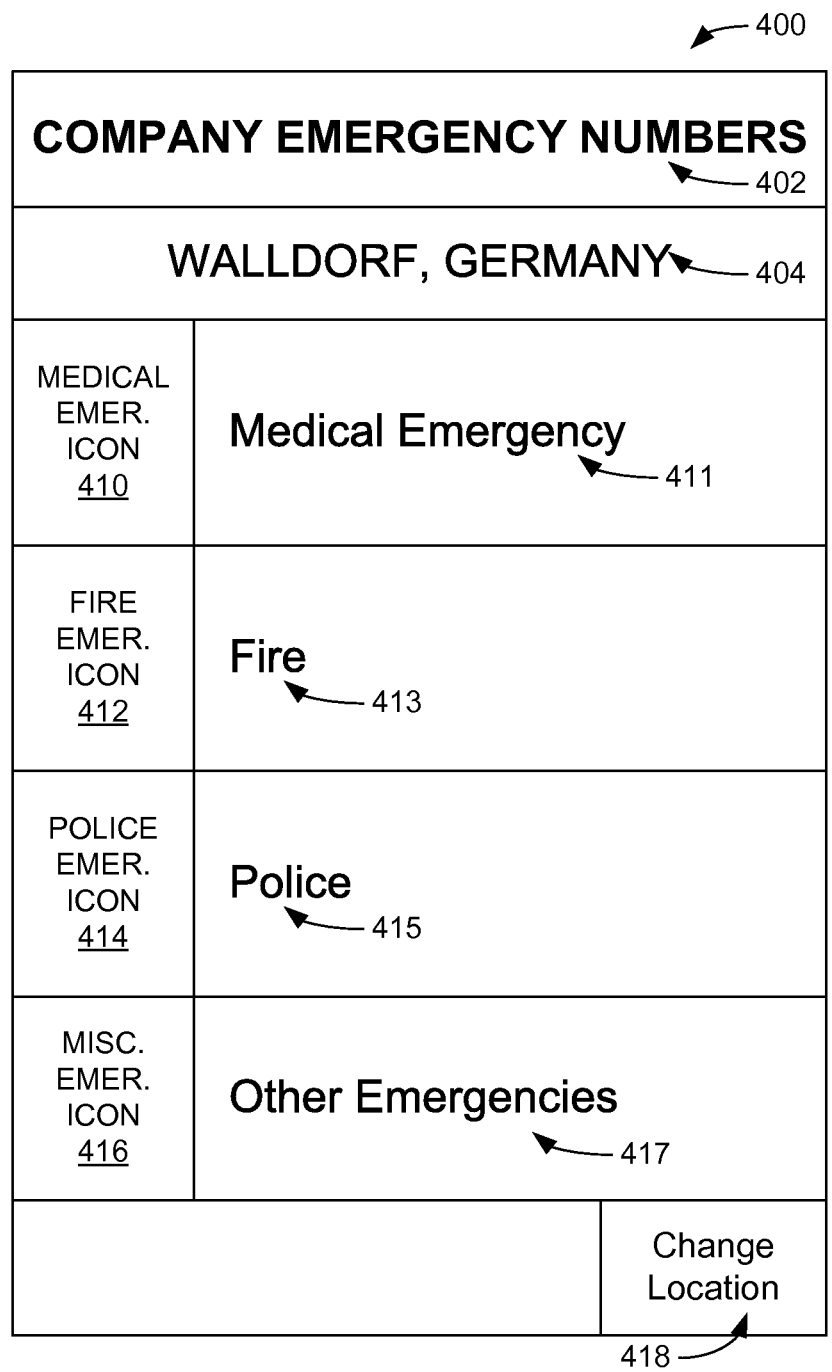
FIG. 4 is a graphical representation of an example smartphone display of emergency information for a specific location.

FIG. 4 is a graphical representation of an example smartphone display 400 of emergency information for a specific location. In other embodiments, the display 400 may be presented on any other user device, such as, for example, a tablet computer, a laptop computer, a desktop computer, or another communication device. The emergency information shown in FIG. 4 may be provided using hierarchical emergency information, such as the hierarchical emergency information 300 illustrated in FIG. 3A. In one implementation, the display 400 may be presented to the user in response to the user initiating execution of an application on the smartphone. In other examples, the display 400 may be a display of a web page accessed using the smartphone.

As shown, the display 400 provides a heading 402 indicating that the information being presented is emergency information associated with a particular company or corporation. Also displayed is a location indicator 404 (Walldorf, Germany) indicating a particular geographic locality to which the displayed emergency information pertains. The particular geographic locality may be determined by way of an explicit input by the user indicating the current location of the user, or may be determined within the smartphone via other means, such as, for example, Global Positioning System (GPS) circuitry located on the smartphone, location detection by way of communications of the smartphone with cellphone towers or other equipment, and the like.

Also provided on the display 400 may be a medical emergency information selector 411, a fire emergency information selector 413, a police emergency information selector 415, and miscellaneous emergency information selector 417. Each of the selectors 411, 413, 415, and 417, when activated by the user, such as by way of touching that particular portion of the display 400, may then cause emergency information corresponding to the selected type of emergency to be displayed on the display 400. Displayed in conjunction with each of the selectors 411, 413, 415, and 417 may be an associated emergency icon, such as a medical emergency icon 410, a fire emergency icon 412, a police emergency icon 414, and a miscellaneous emergency icon 416. Also provided on the display 400 may be a "change location" icon 418 that may allow the user to access a menu by which the geographic locality upon which the emergency information is based may be modified.

Figure 5:
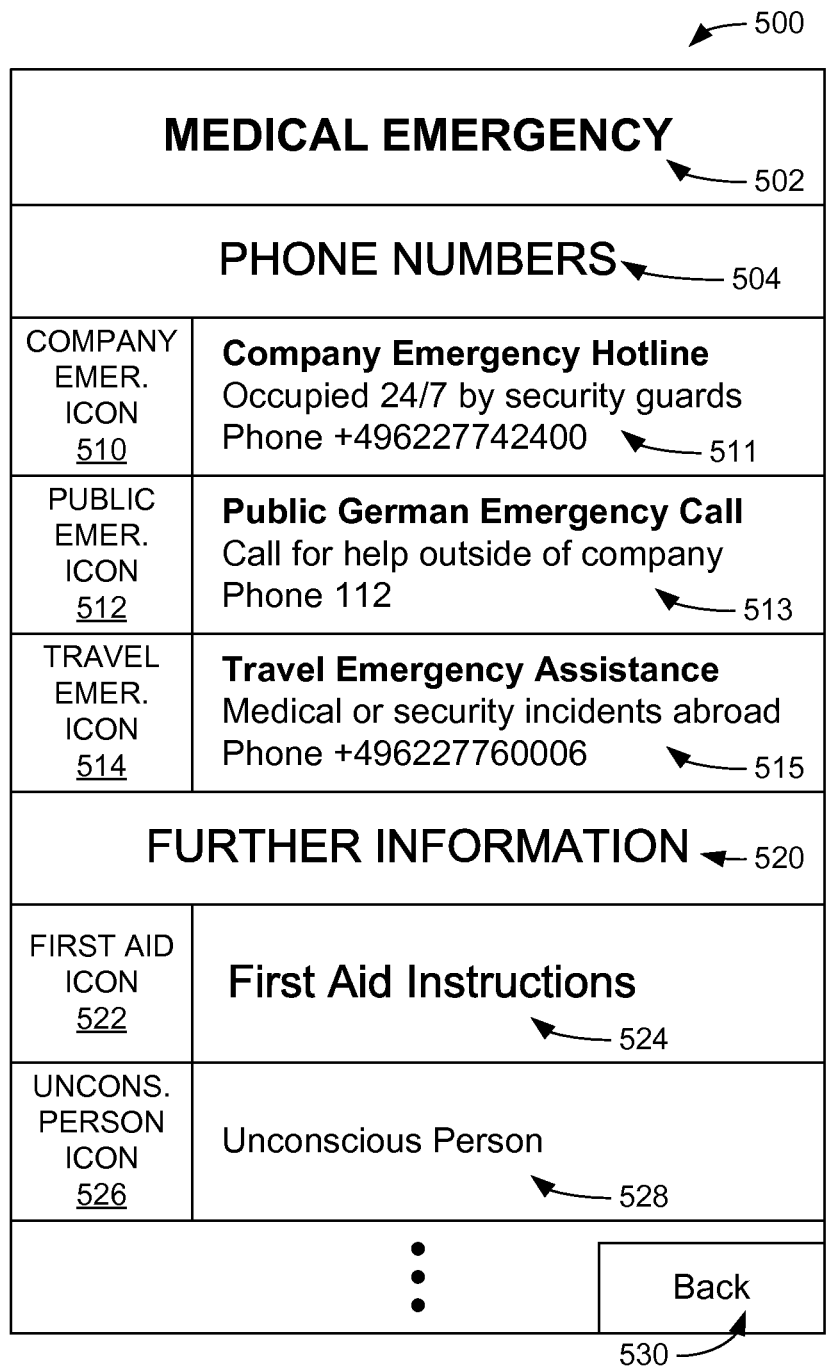
FIG. 5 is a graphical representation of an example smartphone display of medical emergency information for a specific location.

FIG. 5 is a graphical representation of an example smartphone display 500 of medical emergency information for a specific location. In one example, the display 500 may be presented to the user in response to a user selection of the medical emergency information selector 411 of FIG. 4. As depicted in FIG. 5, the display 500 includes a title 502 ("Medical Emergency") indicating that the information being displayed is medical emergency information. In the particular example of FIG. 5, an upper area of the display 500 indicated by a first subheading 504 ("Phone Numbers") provides phone numbers that may be important in the event of a medical emergency. In the example of FIG. 5, the phone number information may include a company emergency hotline 511 for a medical emergency that occurs at a company site; a German public emergency call number 513 for a medical emergency that occurs within Germany, but outside of a corporate location; and a travel emergency assistance number 515 for medical emergencies while travelling outside Germany. Each of the phone numbers 511, 513, and 515 may also be displayed in conjunction with an icon (e.g., a company emergency icon 510, a public emergency icon 512, and a travel emergency icon 514, respectively) to assist the user in identifying the proper phone number for a particular medical emergency.

The display 500, as illustrated in FIG. 5, may also provide a lower area indicated by a second subheading 520 ("Further Information") that may provide more immediate and detailed information to aid the user in addressing a current medical emergency. In this example, a subheading 524 ("First Aid Instructions") and related first aid icon 522 indicate that information helpful for rendering first aid to an injured person follows. Following the first aid instructions subheading 524 may be an unconscious person selector 528 and associated unconscious person icon 526 that, when selected by the user, may cause presentation of text and graphical information providing instructions on how to render aid to an unconscious person. In one example, the user may access other types of first aid information by scrolling downward in the display 500 to reveal information related to other types of medical emergencies. In the example of FIG. 5, the display 500 may also provide a back button 530 that allows the user to return to the previous display 400 of FIG. 4.

In an example, the information provided in the displays 400 and 500 of FIGS. 4 and 5 may be implemented as hierarchical information, in which multiple levels of the hierarchy are associated with various geographical areas. FIG. 6 is a graphical representation of example global and regional emergency information 600 overwritten by national emergency information 620. In this example, the global emergency information and the regional emergency information (e.g., Asia-related emergency information) have already been combined to yield global/Asia emergency information as global and regional emergency information 600.

The global and regional emergency information 600 may include a section that provides a number of different emergency categories, two of which are shown explicitly in FIG. 6: a medical emergency category 610 and a fire emergency category 615. Each of the emergency categories 610 and 615 may be identified by way of a identifier 611, such as "Medical" and "Fire". Each of the emergency categories 610 and 615 may also include a name 612 ("Medical Emergency" and "Fire") and an icon 613 (labeled "Red Cross" and "Flames"). Also as shown in FIG. 6, one or more of the emergency categories 610 and 615 may include one or more phone number entries, in which each phone number entry may include an identifier, a name, and the actual phone number for that entry.

In one example, the global and regional emergency information 600 may be represented as Java®-based information. However, any type of data format or structure, such as Extensible Markup Language (XML), that is amenable for storage in a database, with or without translation, may be employed in other embodiments.

Also shown in FIG. 6 is national emergency information 620 (e.g., national information for the country of Turkey), which represents a lower hierarchical level of emergency information below the global and regional emergency information 600 described above. In the national emergency information 620, a single medical emergency category 610 corresponds to the same medical emergency category 610 of the global and regional emergency information 600, as evidenced by the medical emergency identifier 611. However, an icon 632 ("Red Crescent") associated with the medical emergency category 610 in the national emergency information 620 is different from the icon 613 ("Red Cross") employed in the global and regional emergency information 600. In this particular example, residents of the nation of Turkey may more readily associate a red crescent symbol with a medical emergency than the red cross icon employed in some other parts of the world.

When the national emergency information 620 is combined with the global and regional emergency information 600, combined global/regional/national (e.g., global/Asia/Turkey) emergency information 640 may be generated, in which the "Red Cross" icon 613 of the global and regional emergency information 600 is replaced with the "Red Crescent" icon 632 of the national emergency information 620. Accordingly, when the combined global/regional/national emergency information 640 is displayed to a user located in Turkey, the "Red Crescent" icon 632 will be displayed instead of the "Red Cross" icon 613. As depicted in FIG. 6, the other information provided in the global and regional emergency information 600 may remain intact, including the other information within the medical emergency category 610 and the entirety of the fire emergency category 615. Further, as shown in FIG. 6, the national emergency information 620 may include only the information that is intended to override information in the higher-level global and regional emergency information 600, possibly along with any information that is included to identify that information, such as the medical emergency identifier 611.

In one example, the generated global/regional/national emergency information 640 may not be stored in a database, but may instead be generated each time a user associated with that particular nation (e.g., Turkey) causes emergency information to be accessed. In that scenario, retrieval of the most current global and regional emergency information 600 and the most current national emergency information 620 may be guaranteed. In other examples, the first generation of the global/regional/national emergency information 640 may be cached for access by another similar resident until either or both of the global and regional emergency information 600 and the national emergency information 620 are updated.

FIG. 7 is a graphical representation of example global and regional emergency information 700 extended by national emergency information 720. In this specific example, global and regional emergency information 700 is information related to Europe, while the national emergency information 720 is associated with Germany.

In the example of FIG. 7, the global and regional emergency information 700 is the same as the global and regional emergency information 600 of FIG. 6, including a single phone number entry 713 for the medical emergency category 610 with an associated identifier ("+496227760006"), name ("Travel Emergency Assistance"), and phone number ("+496227760006"). The national emergency information 720 includes an additional phone number entry 733 for the same medical emergency category 610 with a corresponding identifier ("Germany/112"), name ("Public German Emergency Call"), and phone number ("112"). The national emergency information 720 also includes a new phone number sort order 734, which specifies that the "Germany/112" phone entry be listed before the "+496227760006" phone entry when presented to the user on a user device. In this example, a phone number sort order is not included in the global and regional emergency information 700, as only one phone number for the medical emergency information may have been provided. In other examples, in which a phone number sort order is included in the medical emergency information of the global and regional emergency information 700, the phone number sort order 734 of the national emergency information 720 may override the corresponding phone number sort order of the global and regional emergency information 700.

The global and regional emergency information 700 may then be combined with the national emergency information 720 to generate global/regional/national emergency information 740 (e.g., global/Europe/Germany emergency information) which incorporates the national emergency information 720 (e.g., the phone number entry 733 and the phone number sort order 734) within the global and regional emergency information 700, as illustrated in FIG. 7. As a result, the emergency medical information displayed to a user located in Germany will include information for both phone number entries 713 and 733, with the "Germany/112" phone entry being displayed before the "+496227760006" entry.

While the examples of FIGS. 6 and 7 focus on the merging of combined global/regional emergency information with national emergency information, any number of levels may be combined in a similar manner. For example, global emergency information and regional emergency information may be combined in a similar manner, resulting in the global and regional emergency information 600 and 700 of FIGS. 6 and 7. Also, either or both of the resulting global/regional/national emergency information 640 and 740 described above may also be combined with local emergency information, such as information relating to a particular corporate site, to generate combined global/regional/national/local emergency information for presentation to a user. Other hierarchical information levels other than those specifically described herein may be combined accordingly in other examples.

Figure 8:
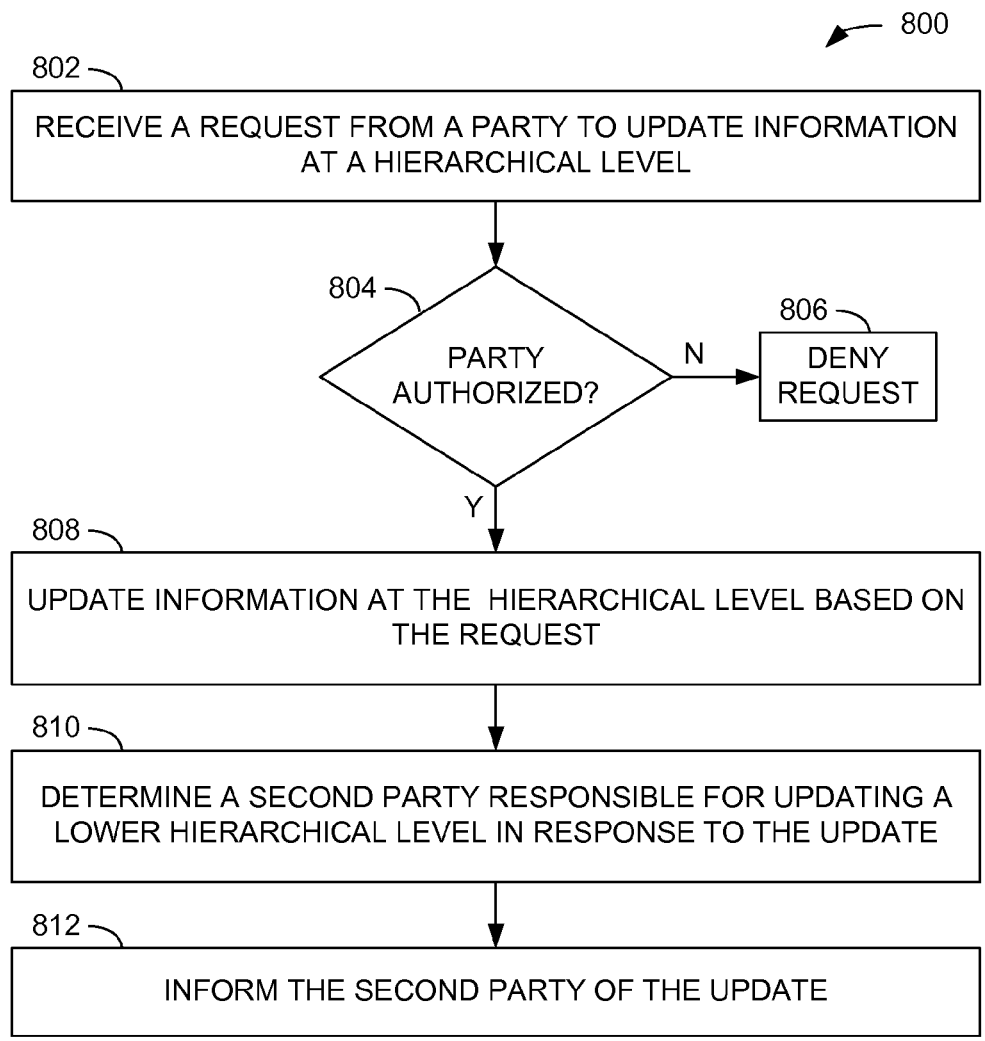
FIG. 8 is a flow diagram of an example method of modifying or updating hierarchical information.

FIG. 8 is a flow diagram of an example method 800 of modifying or updating hierarchical information, such as the types of hierarchical information described above. In the method 800, a request to update information of at least one hierarchical level may be received from a party (operation 802). A determination may then be made as to whether the party is authorized (operation 804). For example, in the examples of FIGS. 6 and 7, certain predetermined parties or individuals may be authorized to generate and modify global emergency information, others authorized to generate and modify regional emergency information, still others authorized to generate and modify national emergency information, and so on. In other examples, different parties or groups each may be authorized to generate and update different types of information within a particular hierarchical level. Such authorization may be determined by the particular job or role of the party, the expertise possessed by the party in the type of information being generated, and/or other factors. In some examples, the authorization determination may also include an authentication operation in which the identity of the requesting party is verified, such as by way of, for example, user name and password.

If the requesting party is not authorized to perform the modifications or updates, the request may be denied (operation 806). If, instead, the requesting party is authorized, the information at the indicated hierarchical level or levels is updated based on the request (operation 808). Such modifications may include, for example, adding, removing, or modifying information included at the particular hierarchical level being modified.

In one implementation, the request may include specific queries which may be employed to alter the hierarchical information stored in the database. In another embodiment, the request may include a file or other data structure, such as, for example, a spreadsheet, that indicates one or more desired modifications to the hierarchical information in a more user-friendly format. In such an embodiment, the hierarchical information may then be updated based on the contents of the file or data structure, such as by generating one or more database queries based on the file or data structure to update the hierarchical information in the database in the desired fashion.

In some examples, the modification of a particular hierarchical level may influence parties responsible for providing and updating information at one or more hierarchical levels to update the information at those levels. To that end, the method 800 may include a determination of a second party responsible for updating a lower hierarchical level in response to the update (operation 810). The second party may then be informed of the update (operation 812). In response to the update, the second party may issue a separate request to update the hierarchical information at the lower hierarchical level or levels for which the second party is responsible.

As a result of at least some of the embodiments described above, information that is organized in a number of hierarchical levels may be combined to provide information that is relevant to one or more individuals. Generally, lower hierarchical levels may include information that is more specific to individuals that are identified according to a particular identity of the individual, a particular geographical location associated with the individual, a particular role filled by the individual, or some other information descriptive of the individual. Accordingly, information associated with higher hierarchical levels may be extended, overridden, or otherwise modified using information at lower hierarchical levels to provide information that is relevant to the individual receiving the information. Organizing the information in this manner thus allows information to be adapted or tuned to particular individuals or groups of individuals.

Additionally, by organizing the information hierarchically, the generation and updating of the information may be distributed to small groups or individual entities with the appropriate knowledge or authorization to update information at the hierarchical levels to which the entities are assigned. Accordingly, the amount of redundant effort involved in the generation and maintenance of the information that is likely to occur may be reduced significantly compared to the effort involved in generating and maintaining multiple separate sets of information, with each set being directed to a particular individual or group.

Figure 9:
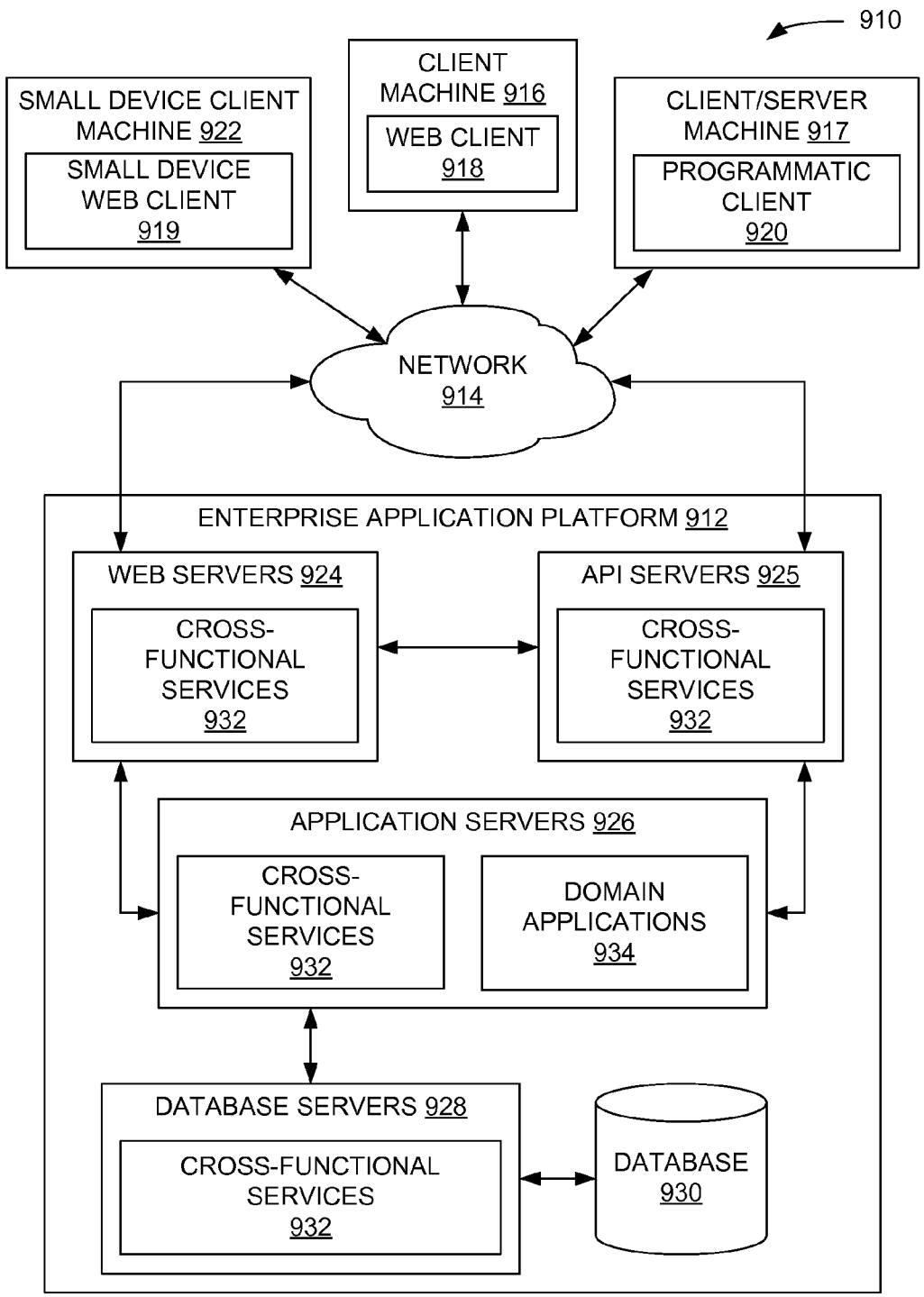
FIG. 9 is a block diagram of an example system having a client-server architecture for an enterprise application platform capable of employing the systems and methods described herein.

FIG. 9 is a network diagram depicting an example system 910, according to one exemplary embodiment, having a client-server architecture configured to perform the various methods described herein. A platform (e.g., machines and software), in the exemplary form of an enterprise application platform 912, provides server-side functionality via a network 914 (e.g., the Internet) to one or more clients. FIG. 9 illustrates, for example, a client machine 916 with a web client 918 (e.g., a browser, such as the Internet Explorer® browser developed by Microsoft® Corporation), a small device client machine 922 with a small device web client 919 (e.g., a browser without a script engine), and a client/server machine 917 with a programmatic client 920.

Turning specifically to the enterprise application platform 912, web servers 924 and application program interface (API) servers 925 are coupled to, and provide web and programmatic interfaces to, application servers 926. The application servers 926 are, in turn, shown to be coupled to one or more database servers 928, which may facilitate access to one or more databases 930. The web servers 924, API servers 925, application servers 926, and database servers 928 may host cross-functional services 932. The application servers 926 may further host domain applications 934.

The cross-functional services 932 may provide user services and processes that utilize the enterprise application platform 912. For example, the cross-functional services 932 may provide portal services (e.g., web services), database services, and connectivity to the domain applications 934 for users that operate the client machine 916, the client/server machine 917, and the small device client machine 922. In addition, the cross-functional services 932 may provide an environment for delivering enhancements to existing applications and for integrating third-party and legacy applications with existing cross-functional services 932 and domain applications 934. Further, while the system 910 shown in FIG. 9 employs a client-server architecture, the present disclosure is, of course, not limited to such an architecture, and could equally well find application in a distributed or peer-to-peer architecture system.

Figure 10:
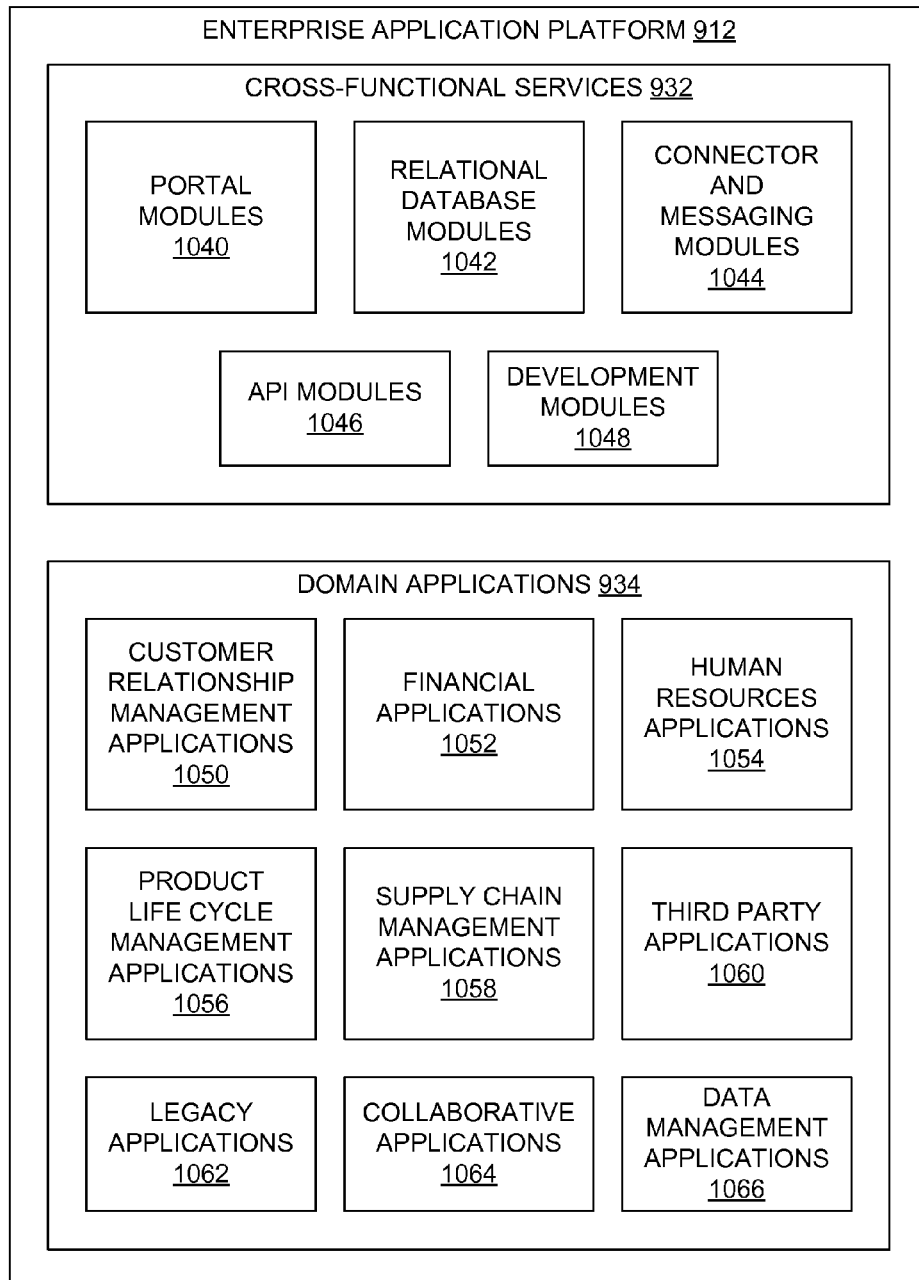
FIG. 10 is a block diagram of example applications and modules employable in the enterprise application platform of FIG. 10.

FIG. 10 is a block diagram illustrating example enterprise applications and services, such as those described herein, as embodied in the enterprise application platform 912, according to an exemplary embodiment. The enterprise application platform 912 includes cross-functional services 932 and domain applications 934. The cross-functional services 932 include portal modules 1040, relational database modules 1042, connector and messaging modules 1044, API modules 1046, and development modules 1048.

The portal modules 1040 may enable a single point of access to other cross-functional services 932 and domain applications 934 for the client machine 916, the small device client machine 922, and the client/server machine 917 of FIG. 9. The portal modules 1040 may be utilized to process, author, and maintain web pages that present content (e.g., user interface elements and navigational controls) to the user. In addition, the portal modules 1040 may enable user roles, a construct that associates a role with a specialized environment that is utilized by a user to execute tasks, utilize services, and exchange information with other users and within a defined scope. For example, the role may determine the content that is available to the user and the activities that the user may perform. The portal modules 1040 may include, in one implementation, a generation module, a communication module, a receiving module, and a regeneration module. In addition, the portal modules 1040 may comply with web services standards and/or utilize a variety of Internet technologies, including, but not limited to, Java®, Java 2 Platform—Enterprise Edition (J2EE), SAP's Advanced Business Application Programming (ABAP®) Language and Web Dynpro, eXtensible Markup Language (XML), Java Connector Architecture (JCA), Java Authentication and Authorization Service (JAAS), X.509, Lightweight Directory Access Protocol (LDAP), Web Services Description Language (WSDL), WebSphere Service Registry and Repository (WSRR), Simple Object Access Protocol (SOAP), Universal Description, Discovery and Integration (UDDI), and Microsoft .NET.

The relational database modules 1042 may provide support services that include a user interface library for access to the database 930 (FIG. 9). The relational database modules 1042 may provide support for object relational mapping, database independence, and distributed computing. The relational database modules 1042 may be utilized to add, delete, update, and manage database elements. In addition, the relational database modules 1042 may comply with database standards and/or utilize a variety of database technologies including, but not limited to, Structured Query Language (SQL), SQL Database Connectivity (SQLDBC), Oracle®, MySQL, Unicode, Java Database Connectivity (JDBC), as well as logging of database operations performed by the user, enforcing of database user access permissions, and the like.

The connector and messaging modules 1044 may enable communication across different types of messaging systems that are utilized by the cross-functional services 932 and the domain applications 934 by providing a common messaging application processing interface. The connector and messaging modules 1044 may enable asynchronous communication on the enterprise application platform 912.

The API modules 1046 may enable the development of service-based applications by exposing an interface to existing and new applications as services. Repositories may be included in the platform 912 as a central place to find available services when building applications.

The development modules 1048 may provide a development environment for the adding, integrating, updating, and extending of software components on the enterprise application platform 912 without impacting existing cross-functional services 932 and domain applications 934.

Turning to the domain applications 934, customer relationship management applications 1050 may enable access to, and facilitate collecting and storing of, relevant personalized information from multiple data sources and business processes. Enterprise personnel who are tasked with developing a buyer into a long-term customer may utilize the customer relationship management applications 1050 to provide assistance to the buyer throughout a customer engagement cycle.

Enterprise personnel may utilize financial applications 1052 and business processes to track and control financial transactions within the enterprise application platform 912. The financial applications 1052 may facilitate the execution of operational, analytical, and collaborative tasks that are associated with financial management. Specifically, the financial applications 1052 may enable the performance of tasks related to financial accountability, planning, forecasting, and managing the cost of finance.

Human resources applications 1054 may be utilized by enterprise personnel and business processes to manage, deploy, and track enterprise personnel. Specifically, the human resources applications 1054 may enable the analysis of human resource issues and facilitate human resource decisions based on real-time information.

Product life cycle management applications 1056 may enable the management of a product throughout the lifecycle of the product. For example, the product life cycle management applications 1056 may enable collaborative engineering, custom product development, project management, asset management, and quality management among business partners.

Supply chain management applications 1058 may enable monitoring of performances that are observed in supply chains. The supply chain management applications 1058 may facilitate adherence to production plans and on-time delivery of products and services.

Third-party applications 1060, as well as legacy applications 1062, may be integrated with domain applications 934 and utilize cross-functional services 932 on the enterprise application platform 912.

Additionally, collaborative applications 1064 may facilitate joint creation and modification of documents and other work product by multiple users, and data management applications 1066 may enable data organization and other management functions to be performed on data generated by one or more other domain applications 934.

Figure 11:
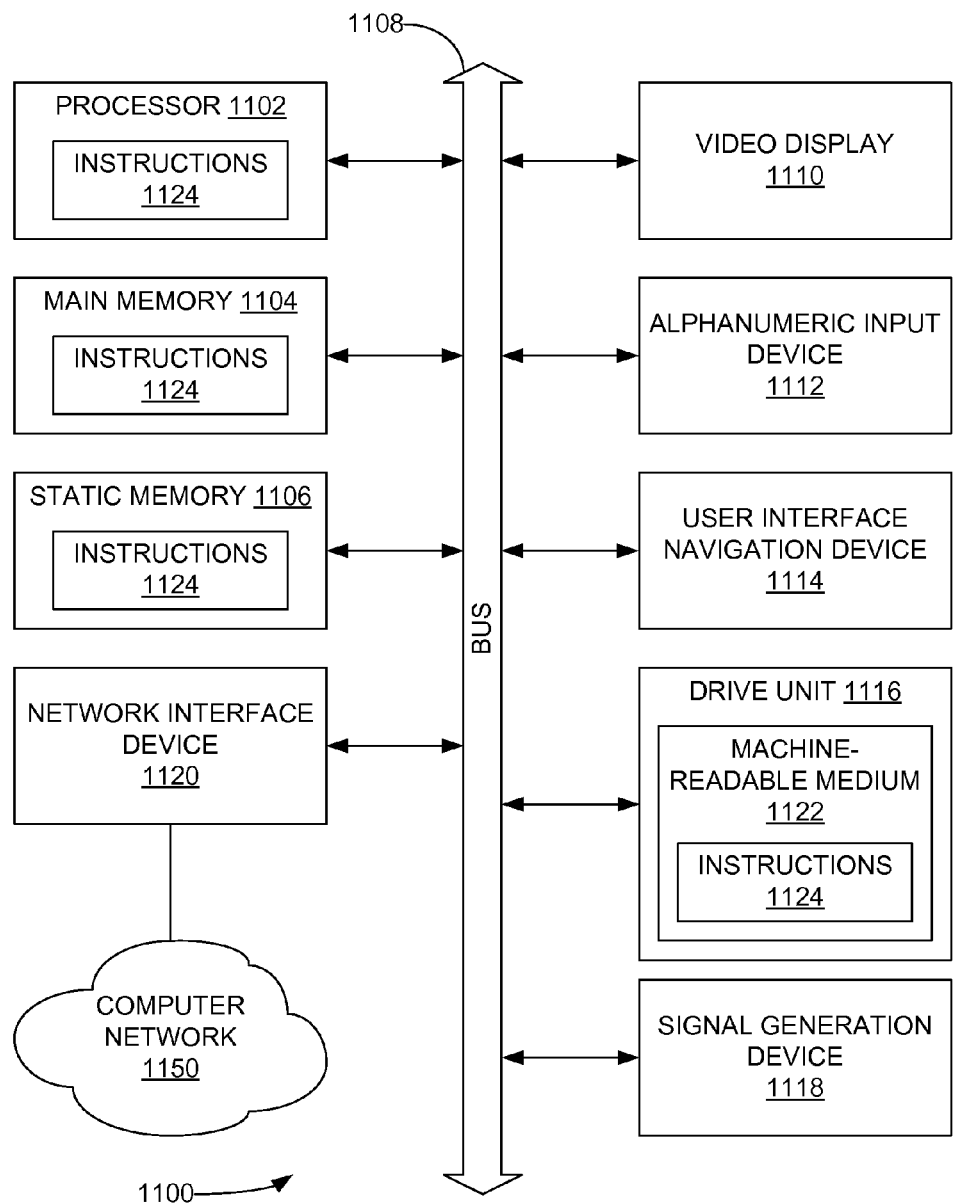
FIG. 11 is a block diagram of a machine in the example form of a processing system within which may be executed a set of instructions for causing the machine to perform any one or more of the methodologies discussed herein.

FIG. 11 depicts a block diagram of a machine in the example form of a processing system 1100 within which may be executed a set of instructions 1124 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions 1124 (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 1100 includes a processor 1102 (e.g., a central processing unit (CPU), a graphics processing unit (GPU), or both), a main memory 1104 (e.g., random access memory), and static memory 1106 (e.g., static random-access memory), which communicate with each other via bus 1108. The processing system 1100 may further include video display unit 1110 (e.g., a plasma display, a liquid crystal display (LCD), or a cathode ray tube (CRT)). The processing system 1100 also includes an alphanumeric input device 1112 (e.g., a keyboard), a user interface (UI) navigation device 1114 (e.g., a mouse), a disk drive unit 1116, a signal generation device 1118 (e.g., a speaker), and a network interface device 1120.

The disk drive unit 1116 (a type of non-volatile memory storage) includes a machine-readable medium 1122 on which is stored one or more sets of data structures and instructions 1124 (e.g., software) embodying or utilized by any one or more of the methodologies or functions described herein. The data structures and instructions 1124 may also reside, completely or at least partially, within the main memory 1104, the static memory 1106, and/or within the processor 1102 during execution thereof by processing system 1100, with the main memory 1104, the static memory 1106, and the processor 1102 also constituting machine-readable, tangible media.

The data structures and instructions 1124 may further be transmitted or received over a computer network 1150 via network interface device 1120 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 1100) or one or more hardware modules of a computer system (e.g., a processor 1102 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 1102 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 1102 that is configured using software, the general-purpose processor 1102 may be configured as respective different hardware modules at different times. Software may accordingly configure the processor 1102, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses that connect the modules). In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 1102 that are temporarily configured (e.g., by software) or permanently configured to perform the relevant operations. Whether temporarily or permanently configured, such processors 1102 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 1102 or processor-implemented modules. The performance of certain of the operations may be distributed among the one or more processors 1102, not only residing within a single machine but deployed across a number of machines. In some example embodiments, the processors 1102 may be located in a single location (e.g., within a home environment, within an office environment, or as a server farm), while in other embodiments, the processors 1102 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of using hierarchical information, the method comprising:
    receiving, from a user device, a request for information associated with a topic;
    in response to the request, retrieving an indicator for a characteristic associated with the user device;
    retrieving, in response to the request, first topic information stored on a database, the first topic information corresponding to a first hierarchical level;
    selecting, based on the request and the indicator, second topic information stored on the database, the second topic information selected from a second hierarchical level lower than the first hierarchical level;
    generating, using at least one hardware processor, combined topic information in a cache of the database, the combined topic information comprising the first topic information modified based on the second topic information within the cache, the combined topic information configured to be retrieved upon the indicator for the characteristic being retrieved in response to a subsequent request from another user device and without repeating the combination of the first topic information or the second topic information and wherein a subsequent request causing retrieval of an indicator for a different characteristic causes the first hierarchical level and the second hierarchical level to be accessed without accessing the combined topic information;
    storing the combined topic information on the database, the combined topic information stored without modifying the first topic information and the second topic information and within a data structure hierarchy including the first hierarchical level and the second hierarchical level;
    transmitting the combined topic information to the user device for display on the user device, based on the request and the indicator for the characteristic associated with the user device; and upon receiving an update to one or more of the first topic information and the second topic information, removing, by the at least one hardware processor, the combined topic information from the database.

2. The method of claim 1, further comprising:
accessing, in response to the request, third topic information corresponding to a third hierarchical level lower than the second hierarchical level;
wherein the combined topic information further comprises a combination of the first topic information and the second topic information modified based on the third topic information.

3. The method of claim 1, wherein the generating of the combined topic information comprises:
determining that a portion of the second topic information differs from a corresponding portion of the first topic information; and
replacing, in the combined topic information, in response to the determining that the portion of the second topic information differs from the corresponding portion of the first topic information, the corresponding portion of the first topic information with the portion of the second topic information.

4. The method of claim 3, wherein:
each of the first topic information and the second topic information comprises a plurality of identifier-value sets; and
the determining that the portion of the second topic information differs from the corresponding portion of the first topic information comprises determining that a value associated with an identifier for the portion of the second topic information differs from a value associated with a same identifier for the corresponding portion of the first topic information.

5. The method of claim 1, wherein the generating of the combined topic information comprises:
determining that a portion of the second topic information does not correspond to any portion of the first topic information; and
adding, to the combined topic information, in response to the determining that the portion of the second topic information does not correspond to any portion of the first topic information, the portion of the second topic information.

6. The method of claim 5, wherein:
each of the first topic information and the second topic information comprises a plurality of identifier-value sets; and
the determining that the portion of the second topic information does not correspond to any portion of the first topic information comprises determining that an identifier for the portion of the second topic information differs from an identifier for each portion of the first topic information.

7. The method of claim 1, wherein:
the second topic information comprises a display order specifying an order in which multiple portions of the combined topic information are to be displayed.

8. The method of claim 7, wherein:
the first topic information comprises a first display order specifying a first order in which multiple portions of the first topic information are to be displayed; and
the first display order differs from the display order of the second topic information.

9. The method of claim 1, wherein:
the request includes information associating the user device with the second topic information; and
the accessing of the second topic information is based on the information associating the user device with the second topic information.

10. The method of claim 9, wherein:
the information associating the user device with the second topic information comprises a geographical location of the user device.

11. The method of claim 1, wherein:
the first topic information corresponds to a first geographical area;
the second topic information corresponds to a second geographical area that is smaller than the first geographical area; and
the first geographical area comprises the second geographical area.

12. The method of claim 1, wherein:
each of the first topic information and the second topic information comprises emergency contact information.

13. The method of claim 1, further comprising:
receiving, from a first party, an update request to update a portion of the first topic information;
determining, in response to the update request, whether the first party is authorized to update the portion of the first topic information; and
updating the portion of the first topic information according to the update request in response to determining that the first party is authorized to update the portion of the first topic information.

14. The method of claim 13, further comprising:
informing, in response to updating the portion of the first topic information, a second party authorized to update a portion of the second topic information of the updating of the portion of the first topic information.

15. A non-transitory computer-readable storage medium comprising instructions that, when executed by at least one processor of a computing system, cause the computing system to perform operations comprising:
receiving, from a user device, a request for information associated with a topic;
in response to the request, retrieving an indicator for a characteristic associated with the user device;
retrieving, based on the request and the indicator, first topic information stored on a database, the first topic information corresponding to a first hierarchical level;
selecting, based on the request and the indicator, second topic information stored on the database, the second topic information selected from a second hierarchical level lower than the first hierarchical level;
generating, using at least one hardware processor, combined topic information in a cache of the database, the combined topic information comprising the first topic information modified based on the second topic information within the cache, the combined topic information configured to be retrieved upon the indicator for the characteristic being retrieved in response to a subsequent request from another user device and without repeating the combination of the first topic information or the second topic information and wherein a subsequent request causing retrieval of an indicator for a different characteristic causes the first hierarchical level and the second hierarchical level to be accessed without accessing the combined topic information;
storing the combined topic information on the database, the combined topic information stored without modifying the first topic information and the second topic information and within a data structure hierarchy including the first hierarchical level and the second hierarchical level;

transmitting the combined topic information to the user device for display on the user device, based on the request and the indicator for the characteristic associated with the user device; and upon receiving an update to one or more of the first topic information and the second topic information, removing, by the at least one hardware processor, the combined topic information from the database.

16. A system comprising:

at least one processor; and a non-transitory computer-readable storage medium comprising instructions that, when executed by the at least one processor, causes the at least one processor to perform operations comprising:

receiving, from a user device, a request for information associated with a topic;

in response to the request, retrieving an indicator for a characteristic associated with the user device;

retrieving, from a database, in response to the request, first topic information corresponding to a first hierarchical level;

selecting, based on the request and the indicator, second topic information stored on the database, the second topic information selected from a second hierarchical level lower than the first hierarchical level;

generating, using at least one hardware processor, combined topic information in a cache of the database, the combined topic information comprising the first topic information modified based on the second topic information within the cache, the combined topic information configured to be retrieved upon the indicator for the characteristic being retrieved in response to a subsequent request from another user device and without repeating the combination of the first topic information or the second topic information and wherein a subsequent request causing retrieval of an indicator for a different characteristic causes the first hierarchical level and the second hierarchical level to be accessed without accessing the combined topic information;

storing the combined topic information on the database, the combined topic information stored without modifying the first topic information and the second topic information and within a data structure hierarchy including the first hierarchical level and the second hierarchical level;

transmitting the combined topic information to the user device for display on the user device, based on the request and the indicator for the characteristic associated with the user device; and upon receiving an update to one or more of the first topic information and the second topic information, removing, by the at least one hardware processor, the combined topic information from the database.

17. The system of claim 16, further comprising the database.

18. The system of claim 16, wherein the operations further comprise:

receiving, from a first party, an update request to update a portion of the first topic information;

determining, in response to the update request, whether the first party is authorized to update the portion of the first topic information; and updating the portion of the first topic information according to the update request in response to the party authorization module determining that the first party is authorized to update the portion of the first topic information.

19. The system of claim 18, wherein the operations further comprise:

informing, in response to the updating the portion of the first topic information, a second party authorized to update a portion of the second topic information of the updating of the portion of the first topic information.

20. The system of claim 18, wherein the operations further comprise:

receiving a file comprising multiple updates to at least one of the first topic information and the second topic information; and updating the at least one of the first topic information and the second topic information in the database based on the file.

* * * * *